United States Patent [19]
Klarlund

[11] Patent Number: 5,889,510
[45] Date of Patent: Mar. 30, 1999

[54] FOOT-OPERATED KEYBOARD DEVICE

[75] Inventor: Nils Klarlund, Colonia, N.J.

[73] Assignee: AT&T Corp., Middletown, N.J.

[21] Appl. No.: 738,565

[22] Filed: Oct. 28, 1996

[51] Int. Cl.$^6$ ........................................................ G09G 5/00
[52] U.S. Cl. ............................ 345/168; 345/169; 341/21; 341/22; 400/475; 400/488
[58] Field of Search ..................... 345/168, 156, 345/169; 400/475, 488; 463/36; 341/21, 22

[56] References Cited

FOREIGN PATENT DOCUMENTS

| | | |
|---|---|---|
| 4035273 | 7/1992 | Germany . |
| 9-114583 | 5/1997 | Japan . |
| 9-258887 | 10/1997 | Japan . |

*Primary Examiner*—Jeffery A. Hofsass
*Assistant Examiner*—Julie B. Lieu

[57] ABSTRACT

A foot-operated keyboard device comprises a support structure and a plurality of switch elements. The support structure extends along a centrally-disposed longitudinal axis and includes an upper panel member. The upper panel member has a first surface with a foot resting region disposed thereon. The foot resting region has a forward toe resting section and a rear heel resting section. The plurality of switch elements are mounted to the support structure and are accessible from the first surface. The plurality of switch elements include at least a first array of switch elements extending traversely to the longitudinal axis in the vicinity of the forward toe resting section of the foot resting region and a second array of switch elements extending transversely to the longitudinal axis in the vicinity of the rear heel resting section of the foot resting region.

28 Claims, 4 Drawing Sheets

FOOT-OPERATED KEYBOARD DEVICE

BACKGROUND OF THE INVENTION

1. Field of the Invention

The present invention relates to a foot-operated keyboard device and, more particularly, is directed to a foot-operated keyboard device that is adapted for use to provide input signals to a computer system.

2. Description of Related Art

Many different types of input devices are used to provide input signals to a computer system. Perhaps the most common input device is a finger-operated keyboard. Other input devices include a mouse, a track ball and a joystick which are hand operated. Unfortunately, each of these input devices requires that the operator must have sufficient manual dexterity in order to provide the appropriate input signals to the computer system. Thus, handicapped computer operators who suffer from hand or arm disabilities sometimes experience difficulty in operating these hand-operated or finger-operated input devices.

One type of input device that does not require manual dexterity is a speech recognition system. Although speech recognition systems are readily available in the marketplace, none has become commonplace. One reason for their lack of popularity is that the most proficient manner to input punctuation commands is by hand-operated or finger-operated input devices.

There is a need in the industry to provide a foot-operated keyboard device which can be easily operated by a computer operator regardless of any hand or arm disability. It would be advantageous if such a foot-operated keyboard device could be used in conjunction with a standard, i.e., finger-operated, keyboard to significantly reduce the stress of repetitive commands typically found in text editing, computer programming and computer-assisted design. There is also a need in the industry to provide a foot-operated keyboard device that can be used in conjunction with a speech recognition system to eliminate the need to enter punctuation commands by hand. The present invention satisfies these needs and provides these advantages.

OBJECTS AND SUMMARY OF THE INVENTION

It is an object of the present invention to provide a foot-operated keyboard device that can provide input signals to a computer system, i.e., a computer and a display, without using one's hands.

It is another object of the present invention to provide a foot-operated keyboard device that can be used in conjunction with a standard computer keyboard.

It is yet still another object of the present invention to provide a foot-operated keyboard device to be used with a standard keyboard to significantly reduce the stress of repetitive commands when editing text, programming or using computer-assisted design.

Yet another object of the present invention is to provide a foot-operated keyboard device to be used in conjunction with a speech recognition system to eliminate the need to input punctuation commands by hand.

Accordingly, a foot-operated keyboard device is hereinafter described. In its broadest form, the foot-operated keyboard device includes a support structure and a plurality of switch elements. The support structure extends along a centrally-disposed longitudinal axis and includes an upper panel member. The upper panel member has a first surface with a foot resting region which is disposed on the first surface. The foot resting region has a forward toe resting section and a rear heel resting section.

The plurality switch elements are mounted to the support structure and are accessible from the first surface. The plurality of switch elements include at least a first array of switch elements and a second array of switch elements. The first array of switch elements extends transversely to the longitudinal axis of the support structure in a vicinity of the forward toe resting section of the foot resting region. The second array of switch elements extends transversely to the longitudinal axis of the support structure in a vicinity of the rear heel resting section of the foot resting region.

BRIEF DESCRIPTION OF THE DRAWINGS

These and other objects of the present invention will be readily appreciated and understood from consideration of the following detailed description of embodiments of the present invention when taken together with the accompanying drawings, in which.

DETAILED DESCRIPTION OF THE PREFERRED EMBODIMENTS

A foot-operated keyboard device is hereinafter described, by way of example only, for use with a computer system. However, one of ordinary skill in the art would comprehend that the foot-operated keyboard device of the present invention can be adapted for other uses such as for operating hydraulically-controlled or electronically-controlled machinery.

Figure 1:
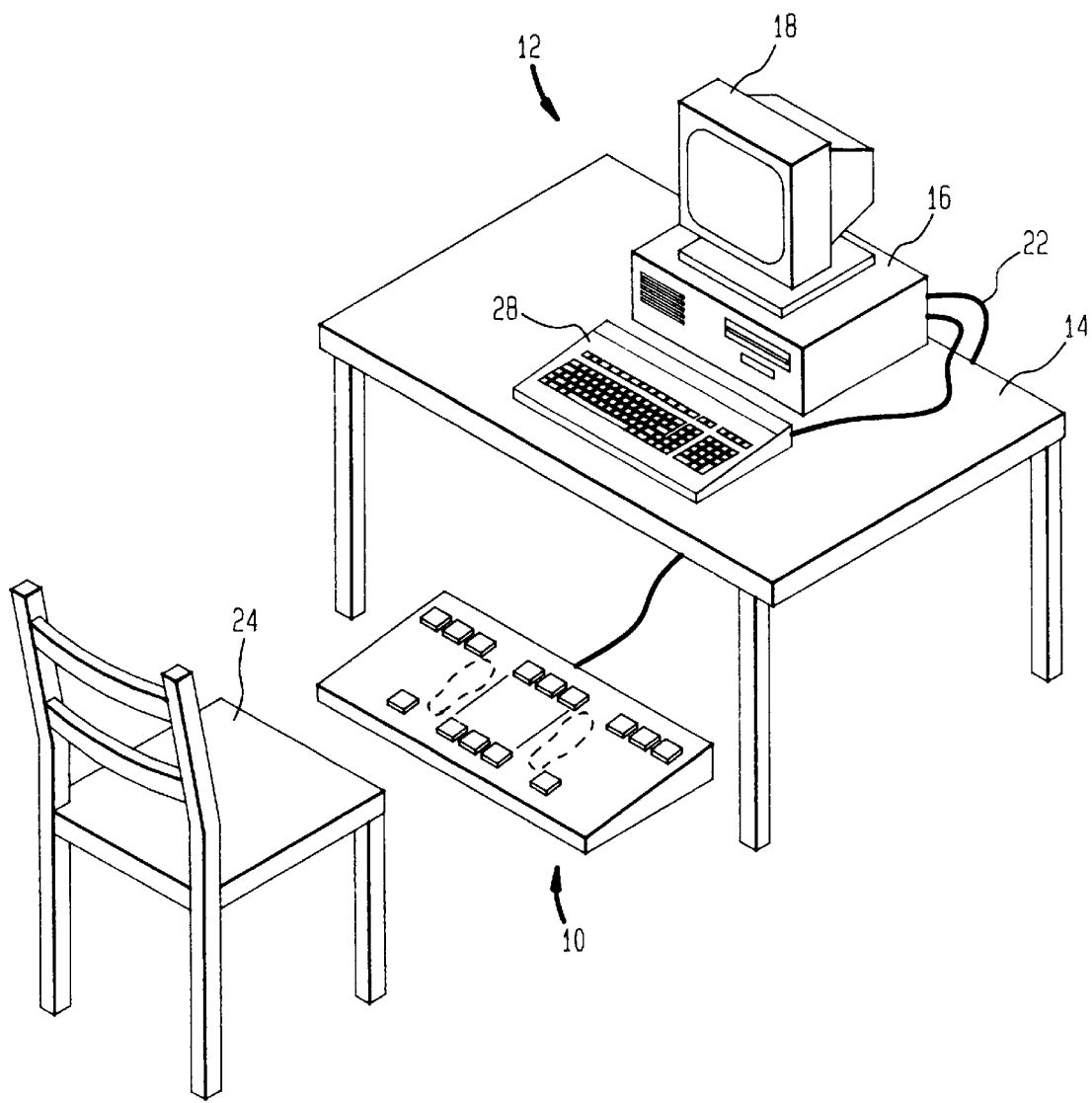
FIG. 1 is a perspective view of a first embodiment of a foot-operated keyboard device of the present invention disposed under a table and connected to a computer system on the table.
Figure 2:
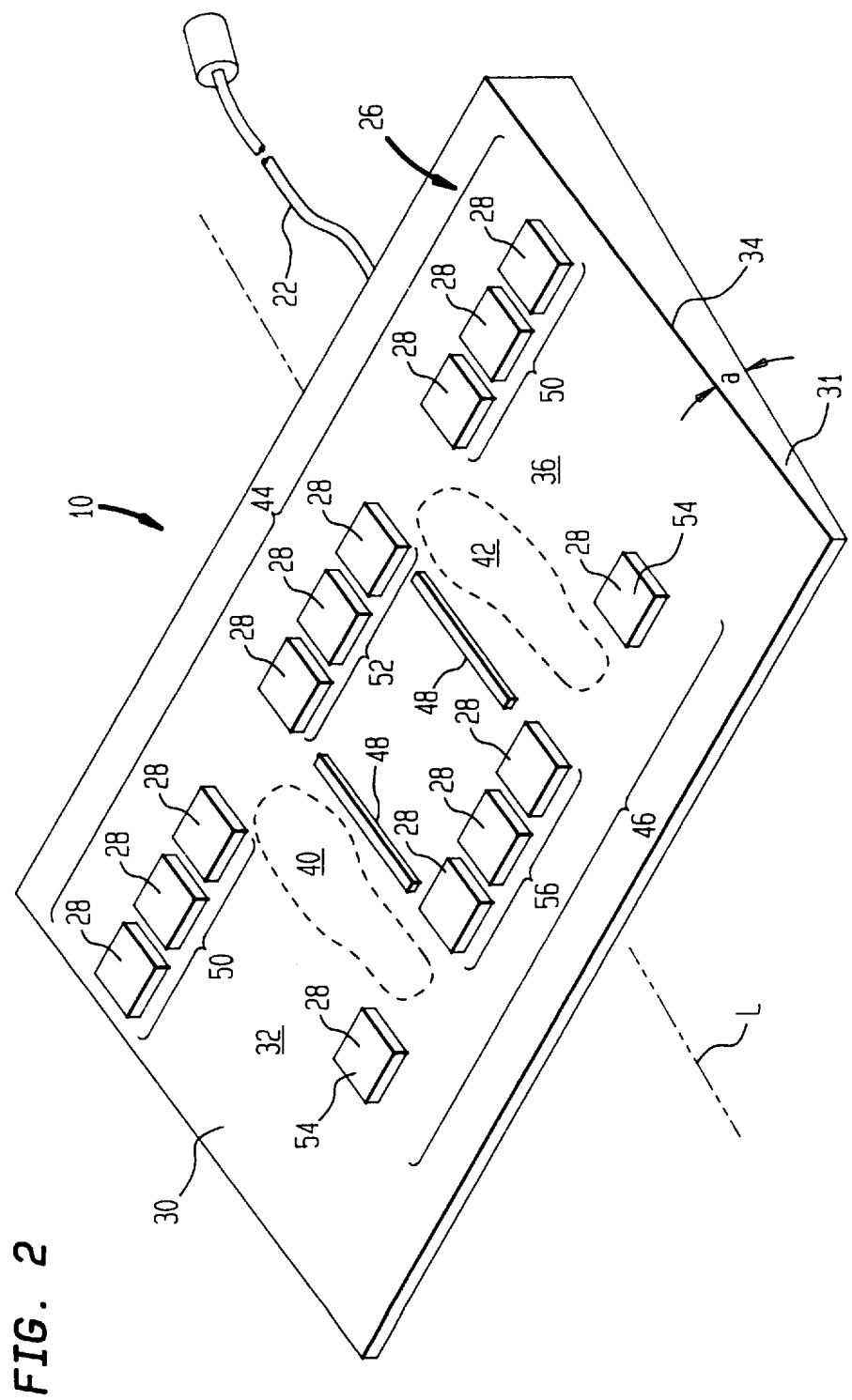
FIG. 2 is an enlarged perspective view of the foot-operated keyboard device of the present invention shown in FIG. 1.

A first embodiment of a foot-operated keyboard device 10 is generally introduced in FIGS. 1 and 2. As shown in FIG. 1, by way of example only, the foot-operated keyboard device 10 is adapted for use with a conventional computer system 12 on a table 14. The conventional computer system 12 includes a computer 16 electrically connected to a display 18 and a standard keyboard 20. The foot-operated device 10 is also electrically connected to the computer 16 via a wire 22 and is disposed under the table 14 and in front of and in close proximity to a chair 24. Thus, when an operator sits in a position to operate the computer system 12, the operator's feet are also in the proper position to operate the foot-operated keyboard 10 of the present invention. The foot-operated keyboard device 10 is used in conjunction with the standard keyboard 20 to provide input signals to the computer 16 and subsequently to the display 18 as is commonly known in the industry.

With reference to FIG. 2, the foot-operated keyboard device 10 includes a support structure 26 and a plurality of switch elements 28. The support structure 26 extends along a centrally-disposed longitudinal axis "L". The support structure 26 has an upper panel member 30 having a first surface 32 with a foot resting region 34 (dashed lines) disposed on the first surface 32 and a base panel member 31. The base panel member 31 is connected to the upper panel member 30 at an acute angle "a" relative to the upper panel member 30 to form, in cross-section, a wedge-shaped configuration. The foot resting region 34 is subdivided into a forward toe resting section 36 and a rear heel resting section 38.

Furthermore, the foot resting region 34 includes a pair of foot resting positions 40 and 42 as depicted by the dashed-line footprints. The pair of foot resting positions 40 and 42 are disposed on the first surface 32 and are spaced apart from one another on opposite sides of the longitudinal axis "L". As shown in FIG. 2, each of the foot resting positions 40 and 42 is positioned, in part, in both the forward toe resting section 36 and the rear heel resting section 38.

The plurality of switch elements 28 are mounted to the support structure 26 and are accessible from the first surface 32. The plurality of switches 28 include a first array 44 of switch elements 28 and a second array 46 of switch elements 28. The first array 44 of switch elements 28 is arranged in a first row that extends transversely to the longitudinal axis "L" in a vicinity of the forward toe resting section 36 of the foot resting region 34. The second array 46 of switch elements 28 is arranged in a second row that extends transversely to the longitudinal axis "L" in a vicinity of the rear heel resting section 38 of the foot resting region 34.

Each of the first and second arrays 44 and 46, respectively, of switch elements 28 are operably and electrically connected to the computer 16 by the wire 22. The operator's feet can cause selected ones of the switch elements 28 to change between a first switch state and a second switch state, thereby providing input signals to the computer 16. It is commonly known in the industry that changing a switch element between a first switch state and a second switch state provides input signals to the computer and, therefore, no further discussion is necessary.

The foot-operated keyboard device 10 also includes a first pair of longitudinally extending guide rails 48 that are connected to and project from the first surface 32. Each of the first pair of the guide rails 48 is disposed opposite one another relative to the longitudinal axis "L" and interiorly of respective ones of the foot resting positions 40 and 42, as shown in FIG. 2. Each of the guide rails 48 provide tactile feedback to the operator at each foot to assure the operator that his/her feet are properly positioned on the foot-operated keyboard device 10 during use, thus eliminating a need for visual guidance.

As shown in FIG. 2, and by way of example only, the first array 44 of the switch elements 28 includes a pair of forward side groups 50 of three switch elements 28 and a forward central group 52 of three switch elements 28 which is disposed between the pair of forward side groups 50. Also, by way of example only, the second array 46 of switch elements 28 includes a pair of rearward side switch elements 54 and a rear central group 56 of three switch elements 28 which is disposed between the pair of rear side switch elements 54. For the first embodiment of the foot-operated keyboard device 10 of the present invention, each of the forward central group 52 of three switch elements 28 and the rear central group 56 of three switch elements 28 is centrally disposed about the longitudinal axis "L", as shown in FIG. 2.

It is commonly known in the computer industry that a shift command, a control "CTRL" command, and an alternate "ALT" command on the standard keyboard 20 are considered modifier commands. One characteristic of the modifier commands is that the selected keys associated with the shift command, control command and alternate command must first be depressed and held in the depressed position before a non-modifier key is depressed. By way of example, in order to capitalize the letter "a", the shift key is first depressed and held in its depressed position until the "a" key is struck to produce a capital "A". After the "a" key is struck, the shift key can be released from its depressed position.

By way of example only, and not by way of limitation, select ones of the second array 46 of the switch elements 28 are operative as computer modifier commands. Thus, an operator's heel is used to depress and retain the modifier switch elements in the depressed position. Using an operator's heel is a simple and comfortable bodily movement for depressing a modifier key and retaining it in a depressed position for a brief period of time. Correspondingly, select ones of the first array 44 of the switch elements 28 are operative, for example, to move a cursor image on the display 18 in either a horizontal direction or a vertical direction as is commonly known in the art.

For the first embodiment of the foot-operated keyboard device 10 of the present invention, the first and second arrays 44 and 46, respectively, are arranged in a manner whereby consecutive ones of the switch elements 28 form a straight line. Also, for the first embodiment of the foot-operated keyboard device 10 of the present invention, the plurality of the switch elements 28 are the same type of switch element.

Figure 3:
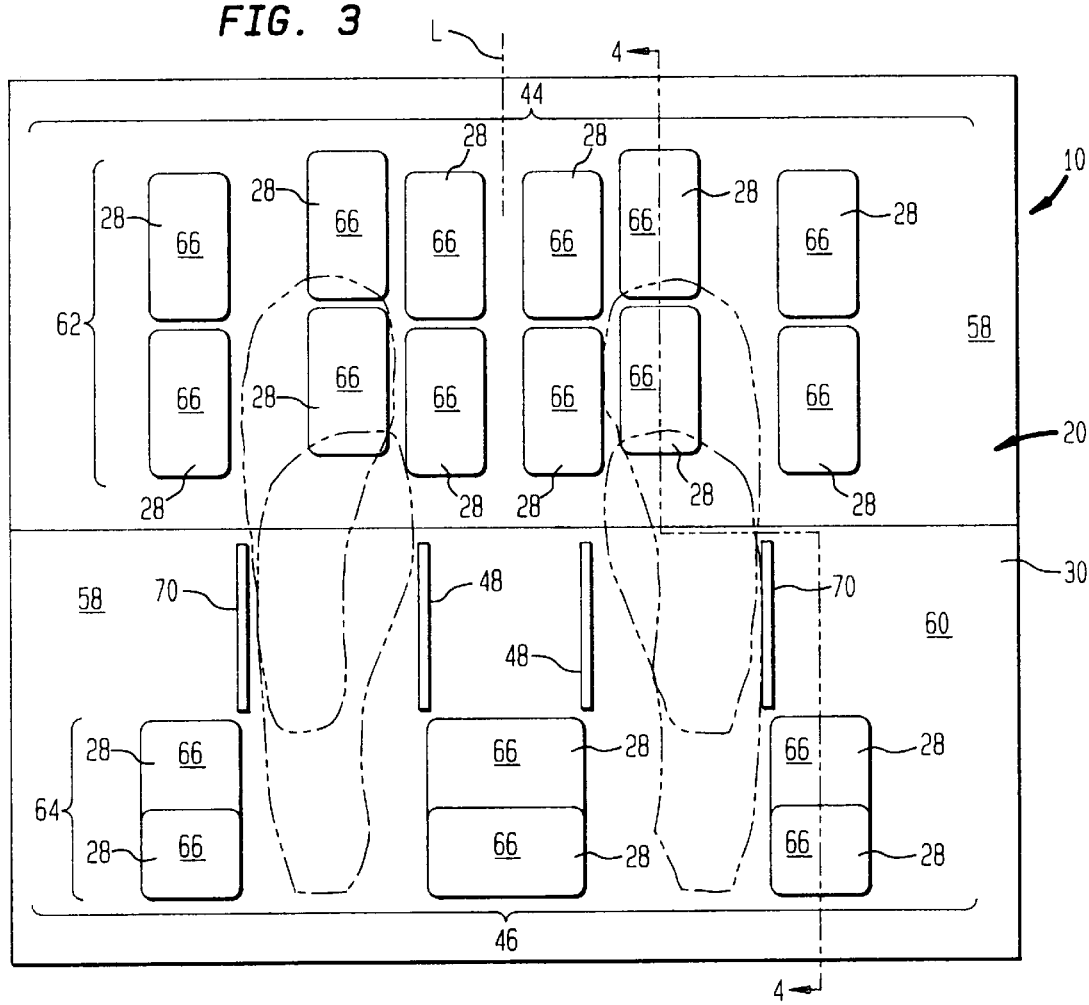
FIG. 3 is a top plan view of a second embodiment of the foot-operated keyboard device of the present invention.
Figure 4:
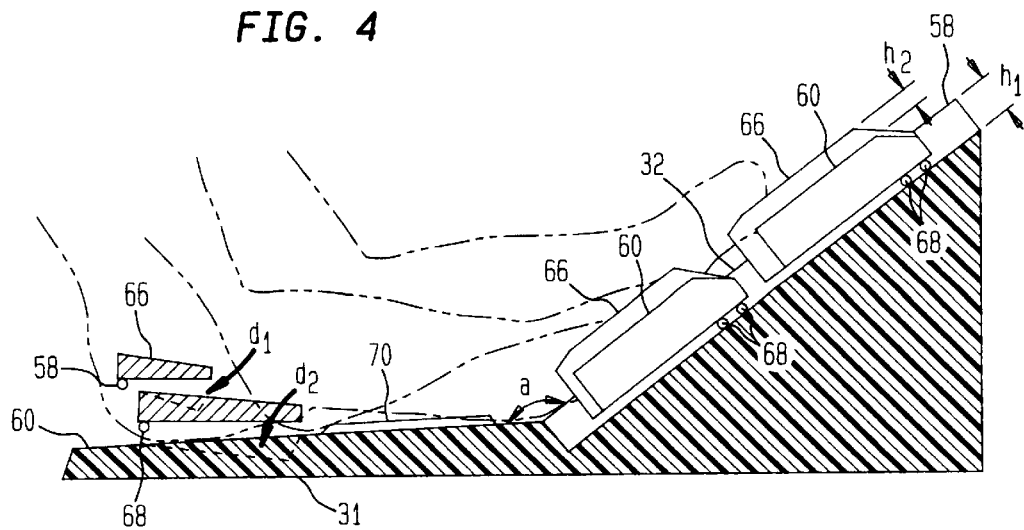
FIG. 4 is a side view in cross-section of the second embodiment of the foot-operated keyboard device of the present invention taken along line 4—4 in FIG. 3.

A second embodiment of a foot-operated keyboard device 110 is generally introduced in FIGS. 3 and 4. The second embodiment of the foot-operated keyboard device 110 also includes a support structure 26 and the plurality of switch elements 28, as described above. The upper panel member 30 includes a first panel portion 58 and a second panel portion 60 which is disposed at an obtuse angle "o" relative to the first panel portion 58.

The first array 44 of the switch elements 28 includes a plurality of forward tandem pairs 62 of switch elements 28. The first array 44 of switch elements 28 is disposed on the first panel portion 58. The second array 46 of switch elements 28 includes a plurality of rearward tandem pairs 64 of the switch elements 28 and is disposed on the second panel portion 60.

Each of the switch elements 28 includes a switch cover 66 which is sized and adapted for being contacted by an operator's foot, as shown by the dotted and dashed imaginary feet in FIGS. 3 and 4. With reference to FIG. 4, each of the switch covers 66 is pivotally movable about a shaft axis 68 that extends transversely to the longitudinal axis "L". When a select one of the switch covers 66 is depressed by the operator's foot, a respective one of the switch elements 28 changes between the first switch state and the second switch state to provide input signals to the computer 16. Also, one switch cover 66 of each of the tandem pairs 62 or 64 of the switch elements 28 is displaceable at a first distance "$d_1$" and another switch cover 66 of the tandem pairs 62 or 64 of the switch elements 28 is displaceable at a second distance "$d_2$". For the second embodiment of the foot-operated keyboard device 110 of the present invention, it is preferred that the second distance is greater than the first distance, although it is sufficient that the first distance and the second distance are different from one another. By way of example only, respective ones of the shaft axis 68 are disposed forward of the switch covers 66 to provide pivotal movement of the switch covers 66 about the shaft axis 66. One of ordinary skill in the art would appreciate that the amount of force required to trigger a switch element increases the higher up it is applied and, therefore, when an operator's foot is depressing a switch cover on the top most row, he/she is unlikely to accidentally depress any mid-level row switch elements.

As illustrated in FIGS. 3 and 4, the switch elements 28 can be different from one another. Additionally, for the second embodiment of the present invention, select ones of the switch elements 66 have top surfaces disposed above the first surface 32 of the support structure 26 at a first height "$h_1$" while remaining ones of the switch elements 66 have top surfaces disposed above the first surface 32 of the support structure 26 at a second height "$h_2$". As shown in FIG. 4, height "$h_2$" is greater than height "$h_1$," although one of ordinary skill in the art would appreciate that another switch element or other groups of switch elements may have heights that are the same or different from heights "$h_2$" and "$h_1$".

For the second embodiment of the foot-operated keyboard device 110 of the present invention, each pair 62 of the switch elements 28 in the first array 44 is arranged in a manner whereby consecutive ones of the pairs of the switch elements 28 are positioned offset from one another. It follows then that the forward switch elements of each consecutive pair are arranged offset from one another while trailing ones of the switch elements of each consecutive pair are also arranged offset from one another.

Also, the second embodiment of the foot-operated keyboard device 110 of the present invention includes a second pair 70 of longitudinally extending guide rails which are connected to and project from the second panel portion 60 of the first surface 32. Each of the second pair of guide rails 70 is disposed opposite a respective one of the first pair of guide rails 48 and is positioned exteriorly of respective ones of the foot resting positions 40 and 42. With this arrangement of guide rails, an operator is now provided with tactile feedback on both sides of each foot.

Figure 5:
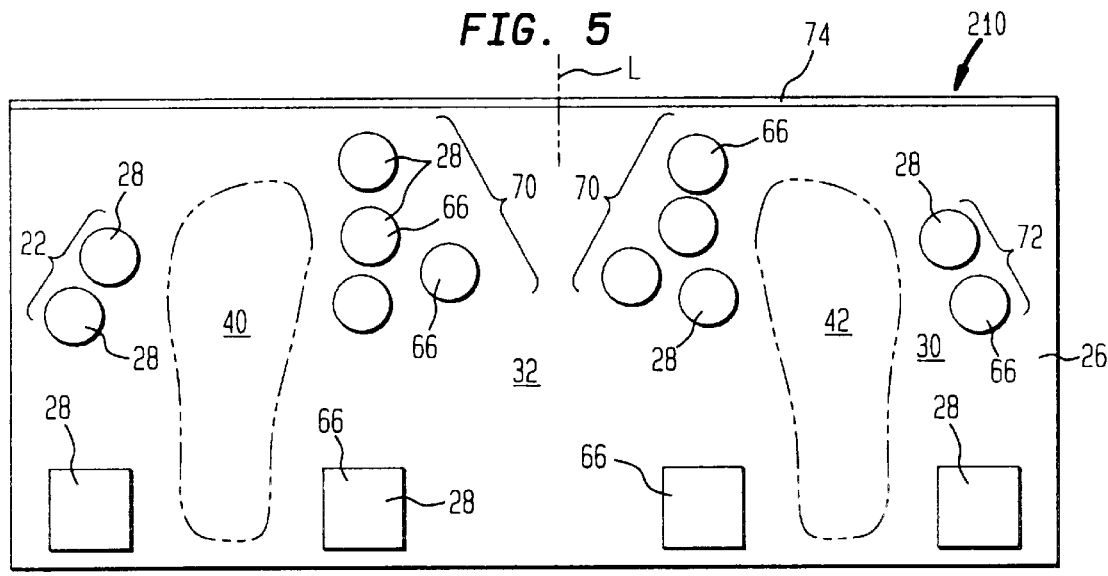
FIG. 5 is a top plan view of a third embodiment of the foot-operated keyboard device of the present invention.
Figure 6:
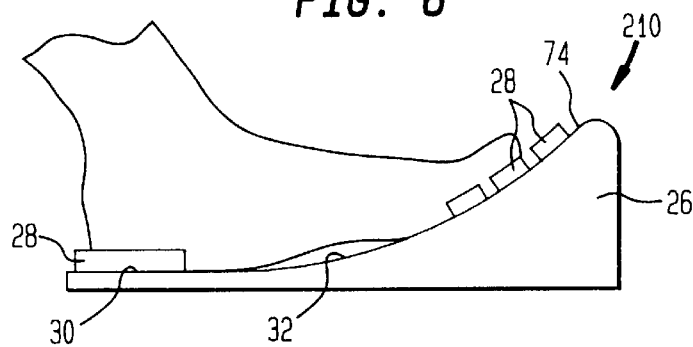
FIG. 6 is a side elevational view of the third embodiment of the foot-operated keyboard device of the present invention.

A third embodiment of a foot-operated keyboard device 210 is generally introduced in FIGS. 5 and 6. The foot-operated keyboard device 210 includes a pair of inner forward groups 70 of the switch elements 28 disposed inwardly toward the longitudinal axis "L" inside the foot resting positions 40 and 42. Although not by way of limitation, each of the inner forward groups 70 of the switch elements 28 have four switch elements 28 with each switch element 28 having a circular switch cover 66. Also, outside of respective ones of the foot resting positions 40 and 42 is an outer forward pair 72 of switch elements 28 with each switch element 28 having a circular switch cover 66. Further, one switch element 28, each with a rectangular-shaped switch cover 66, is disposed on opposite sides of each heel resting section of the foot resting positions 40 and 42.

As best shown in FIG. 6, the first surface 32 of the upper panel member 30 is arcuate. Also, a forward upper edge 74 is curved.

Figure 7:
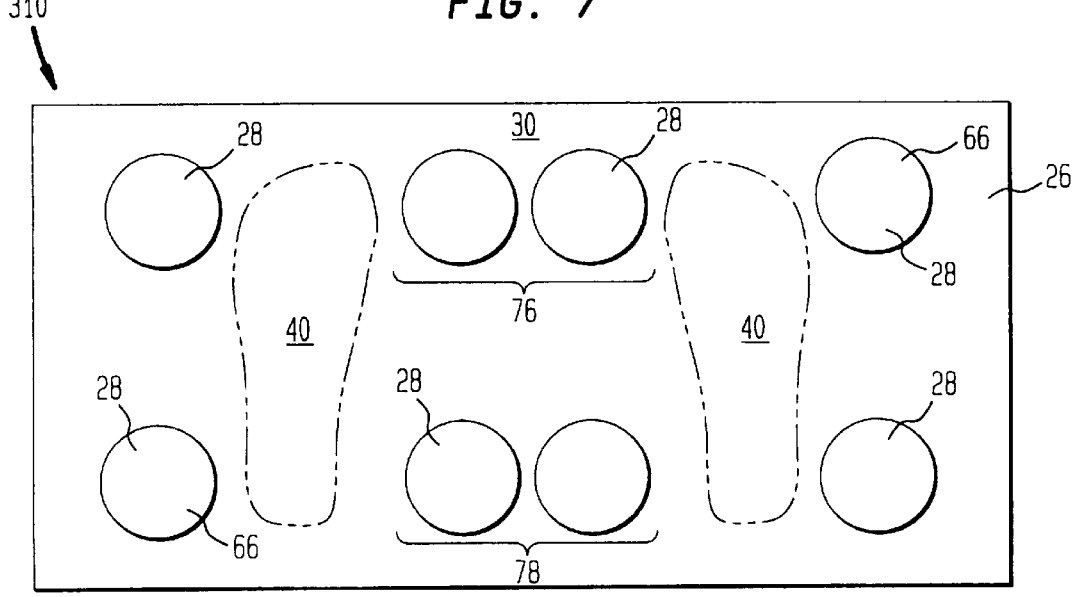
FIG. 7 is a top plan view of a fourth embodiment of the foot-operated keyboard device of the present invention.

A fourth embodiment of a foot-operated keyboard device 310 is illustrated in FIG. 7. By way of example only, a forward pair 76 of switch elements 28 is disposed between the toe resting sections of the foot resting positions 40 and 42, a rearward pair 78 of switch elements 28 is disposed between the heel resting sections of the foot resting positions 40 and 42 and one switch element 28 is located outside of the foot resting positions 40 and 42 at each toe resting section and heel resting section. Although not by way of limitation, each switch element 28 has a circular switch cover 66.

The foot-operated keyboard device of the present invention can be easily operated by the operator's foot or feet and without the use of the operator's hands. The foot-operated keyboard device of the present invention can be used alone or in conjunction with any conventional input device. Specifically, the foot-operated keyboard device can be very useful to assist a handicapped operator having an arm or hand disability or it can be used with a speech recognition system to eliminate the need to provide punctuation commands by hand. One of ordinary skill in the art would appreciate that when the foot-operated keyboard device of the present invention is used in conjunction with a standard keyboard, the stress of making repetitive commands can be significantly reduced. Furthermore, a skilled artisan would appreciate that the number of switch elements, types of switch elements and the arrangement thereof can change based upon the needs of the user.

The present invention has been described with particularity in connection with the specific embodiments. It should be appreciated, however, that many changes may be made to the disclosed embodiments without departing from the inventive concepts as defined by the following claims.

What is claimed is:

1. A foot-operated keyboard device, comprising:

a support structure extending along a central longitudinal axis and including an upper panel member having a first surface with a foot resting region disposed on said first surface, said foot resting region having a forward toe resting section and a rear heel resting section;

a plurality of switch elements mounted to said support structure and accessible from said first surface, said plurality of switch elements including at least a first array of switch elements extending traversely to the longitudinal axis in a vicinity of said forward toe resting section of said foot resting region and a second array of switch elements extending traversely to the longitudinal axis in a vicinity of said rear heel resting section of said foot resting region; and a longitudinally extending guide rail integrally connected to the upper panel member, projecting from the first surface and disposed adjacent the foot resting region.

2. A foot-operated keyboard device, comprising:

a support structure extending along a central longitudinal axis and including an upper panel member having a first surface with a foot resting region disposed on said first surface, said foot resting region having a forward toe resting section and a rear heel resting section and including a pair of foot resting positions disposed opposite one another relative to the longitudinal axis;

a plurality of switch elements mounted to said support structure and accessible from said first surface, said plurality of switch elements including at least a first array of switch elements arranged in a first row and extending traversely to the longitudinal axis in a vicinity of said forward toe resting section of said foot resting region and a second array of switch elements arranged in a second row extending traversely to the longitudinal axis in a vicinity of said rear heel resting section of said foot resting region; and a first pair of longitudinally extending guide rails connected to and protecting from said first surface, each of said first pair of guide rails disposed opposite one another relative to the longitudinal axis and interiorly of respective ones of said foot resting positions.

3. A foot-operated keyboard device according to claim 1, further comprising a second pair of longitudinally extending guide rails connected to and projecting from said first surface, each of said second pair of guide rails disposed opposite a respective one of said first pair of guide rails and exteriorly of respective ones of said foot resting positions.

4. A foot-operated keyboard device according to claim 1, wherein said plurality of said switch elements are one of the same type switch elements and different type switch elements.

5. A foot-operated keyboard device according to claim 4, wherein at least one of said first and second array of switch elements is arranged in a manner whereby consecutive ones of said switch elements form a straight line.

6. A foot-operated keyboard device according to claim 4, wherein consecutive ones of at least one of said first and second array of switch elements is arranged in a manner whereby consecutive ones of said switch elements are positioned offset from one another.

7. A foot-operated keyboard device according to claim 6, wherein select ones of said plurality of switch elements have top surfaces disposed above said support structure at a first height and remaining ones of said plurality of switch elements have top surfaces disposed above said support structure at a second height being different from the first height.

8. A foot-operated keyboard device according to claim 1, wherein said support structure includes a base panel member connected to said upper panel member at an acute angle relative to said upper panel member to form, in cross-section, a wedge-shaped configuration.

9. A foot-operated keyboard device according to claim 1, wherein said upper panel member includes a first panel portion and a second panel portion disposed at an obtuse angle relative to said first panel portion, whereby said first array of switch elements is accessible on said first panel portion and said second array of switch elements is accessible on said second panel portion.

10. A foot-operated keyboard device according to claim 1, wherein at least one of said first and second arrays of switch elements is subdivided into groups of switch elements.

11. A foot-operated keyboard device according to claim 10, wherein said first array of switch elements includes a pair of forward side groups of switch elements and a forward central group of switch elements disposed between said pair of forward side groups of switch elements, and wherein said second array of switch elements includes a pair of rearward side switch elements and a rear central group of switch elements disposed between said pair of rearward side switch elements.

12. A foot-operated keyboard device according to claim 11, wherein said each of said forward central group of switch elements and said rearward central group of switch elements is centrally disposed about the longitudinal axis.

13. A foot-operated keyboard device according to claim 10, wherein said first array of switch elements includes a plurality of forward tandem pairs of switch elements and said second array of switch elements includes a plurality of rearward tandem pairs of switch elements.

14. A foot-operated keyboard device according to claim 13, wherein one switch element of each of said forward and rearward tandem pairs of switch elements is displaceable a first distance, and another one of said switch elements of each of said tandem pairs of switch elements is displaceable a second distance that is different from the first distance.

15. A foot-operated keyboard device according to claim 1, wherein each of said switch elements includes a switch cover sized and adapted for being contacted by an operator's foot.

16. A foot-operated keyboard device according to claim 15, wherein said switch cover is pivotally movable about a shaft axis extending transversely to the longitudinal axis.

17. A foot-operated keyboard device adapted for use to provide input signals to a computer, comprising:

a support structure extending along a central longitudinal axis and having an upper panel member having a first surface with a foot resting region including a pair of foot resting positions disposed on said first surface and spaced apart from one another on opposite sides of the longitudinal axis, said foot resting region having a forward toe resting section and a rear heel resting section;

a first pair of longitudinally extending guide rails connected to and projecting from said first surface, each of said first pair of guide rails disposed opposite one another relative to the longitudinal axis and interiorly of respective ones of said foot resting positions; and a plurality of switch elements mounted to said support structure and accessible from said first surface, said plurality of switches including at least a first array of switch elements arranged in a first row extending traversely to the longitudinal axis in a vicinity of said forward toe resting section of said foot resting region and a second array of switch elements arranged in a second row extending traversely to the longitudinal axis in a vicinity of said rear heel resting section of said foot resting region, each of said first and second arrays of switch elements operably connected to the computer so that an operator's foot can cause select ones of said switch elements to change between a first switch state and a second switch state to thereby provide input signals to the computer.

18. A foot-operated keyboard device according to claim 1, wherein each guide rail of the first pair of guide rails and the second pair of guide rails is immovable.

19. A foot-operated keyboard device according to claim 1, wherein each guide rail of the first pair of guide rails and the second pair of guide rails is integrally formed with the upper panel member.

20. A foot-operated keyboard device according to claim 17, further comprising a second pair of longitudinally extending guide rails connected to and projecting from said first surface, each of said second pair of guide rails disposed opposite a respective one of the first pair of guide rails and exteriorly of respective ones of said foot resting positions.

21. A foot-operated keyboard device according to claim 17, wherein said plurality of said switch elements are one of the same type switch elements and different type switch elements, and wherein at least one of said first and second rows is arranged in a manner whereby consecutive ones of said switch elements are positioned in one of a straight row and an offset row.

22. A foot-operated keyboard device according to claim 17, wherein said support structure includes a base panel member connected to said upper panel member at an acute angle relative to said upper panel member to form, in cross-section, a wedge-shaped configuration.

23. A foot-operated keyboard device according to claim 17, wherein said upper panel member includes a first panel portion and a second panel portion disposed at an obtuse angle relative to said first panel portion, whereby said first array of switch elements is disposed on said first panel portion and said second array of switch elements is disposed on said second panel portion.

24. A foot-operated keyboard device according to claim 17, wherein said first array of switch elements includes a pair of forward side groups of switch elements and a forward central group of switch elements disposed between said pair of forward side groups of switch elements and said second array of switch elements includes a pair of rearward side switch elements and a rear central group of switch elements disposed between said pair of rearward side switch elements, and wherein each of said forward central group of switch elements and said rearward central group of switch elements is centrally disposed about the longitudinal axis.

25. A foot-operated keyboard device according to claim 24, wherein said first array of switch elements includes a plurality of forward tandem pairs of switch elements and said second array of switch elements includes a plurality of rearward tandem pairs of switch elements.

26. A foot-operated keyboard device according to claim 17, wherein select ones of said first array of switch elements are operative to move a cursor image on a display connected to the computer in at least one of a horizontal direction and a vertical direction, and wherein select ones of said second array of switch elements are operative as computer modifier commands including a shift command, a control command and an alternate command.

27. A foot-operated keyboard device according to claim 17, wherein each of said switch elements includes a switch cover sized and adapted for being contacted by an operator's foot, and wherein the switch cover is pivotally movable about a shaft axis extending transversely to the longitudinal axis so that upon depressing a select one of said switch covers, a respective one of said switch elements changes between a first switch state and a second switch state to provide input signals to the computer.

28. A foot-operated keyboard device according to claim 27, wherein one switch element of each of said tandem pairs of switch elements is displaceable a first distance and another of said switch elements of said tandem pairs of switch elements is displaceable a second distance that is different from the first distance.

* * * * *